United States Patent [19]

Yamashita

[11] Patent Number: 5,508,924
[45] Date of Patent: Apr. 16, 1996

[54] DRIVING FORCE CONTROLLER FOR AN ELECTRIC VEHICLE WITH ELECTRIC MOTORS PROVIDED FOR ALL DRIVING WHEELS INDIVIDUALLY

[75] Inventor: Mitsugi Yamashita, Nishio, Japan

[73] Assignee: Kabushikikaisha Equos Research, Tokyo, Japan

[21] Appl. No.: 34,375

[22] Filed: Mar. 18, 1993

[30] Foreign Application Priority Data

Mar. 19, 1992 [JP] Japan ................... 4-062817

[51] Int. Cl.$^6$ ................... B60K 1/00; H02P 9/00
[52] U.S. Cl. ................... 364/426.03; 364/426.02; 364/424.01; 180/65.8; 180/197; 318/139
[58] Field of Search ................... 364/424.01, 424.05, 364/426.01, 426.02, 426.03; 180/197, 65.1, 65.2, 65.3, 65.5, 65.8; 318/52, 139; 395/900; 303/93, 100, 102, 103, 105

[56] References Cited

U.S. PATENT DOCUMENTS

| | | |
|---|---|---|
| 3,614,564 | 10/1971 | Hirotsu et al. ................... 318/52 |
| 3,663,875 | 5/1972 | Ashiya ................... 318/52 |
| 4,533,011 | 8/1985 | Heidemeyer et al. ................... 180/65.2 |
| 4,842,342 | 6/1989 | Takahashi et al. ................... 364/426.02 X |
| 5,082,081 | 1/1992 | Tsuyama et al. ................... 180/197 |
| 5,148,883 | 9/1992 | Tanaka et al. ................... 180/197 X |
| 5,161,634 | 11/1992 | Ichihara et al. ................... 180/197 |
| 5,164,903 | 11/1992 | Lin et al. ................... 364/426.03 |
| 5,222,568 | 6/1993 | Higasa et al. ................... 180/65.5 |
| 5,229,955 | 7/1993 | Nishiwaki et al. ................... 364/424.05 |
| 5,289,093 | 2/1994 | Jobard ................... 318/52 X |
| 5,358,317 | 10/1994 | Cikanek ................... 364/426.03 |

*Primary Examiner*—Collin W. Park
*Attorney, Agent, or Firm*—Foley & Lardner

[57] ABSTRACT

A driving force controller for an electric vehicle calculates the optimal driving force of each driving wheel based on a formula in response to the detected wheel acceleration and the difference between the wheel speed and the vehicle speed, or alternatively calculates the optimal driving force of each driving wheel based on fuzzy theory by using predetermined membership functions pertinent to the wheel acceleration, speed difference and driving force in response to the detected wheel acceleration and speed difference. The driving force controller thereby controls the driving force of the driving wheel in accordance with the calculated driving force, and prevents slipping of the driving wheel.

11 Claims, 9 Drawing Sheets

FIG. 5

|  | SPEED DIFFERENCE | | |
|---|---|---|---|
|  | + + | + | o |
| + + | - - - | - - | o |
| + | - - | - | o |
| o | - - | - | o |
| - | - | o | + |
| - - | o | o | + + |

WHEEL ACCELERATION (rows) / DRIVING FORCE (columns)

DRIVING FORCE CONTROLLER FOR AN ELECTRIC VEHICLE WITH ELECTRIC MOTORS PROVIDED FOR ALL DRIVING WHEELS INDIVIDUALLY

BACKGROUND OF THE INVENTION

This invention relates to a driving force controller for an electric vehicle and particularly to a driving force controller suitable for an electric vehicle, with electric motors being provided for all driving wheels individually. Vehicles are automobiles in this invention.

Conventional vehicles are designed to run such that the traction torque produced by an internal combustion engine, for example, is transmitted to the driving wheels through a transmission mechanism so that the driving wheels rotate on the road surface and reaction forces are created on the road surface based on the frictional forces between the wheel tires and the road surface.

The frictional force varies depending on the slip factor between the tire and the road surface. Specifically, during the rotation of a wheel on the road surface, when the wheel speed $v_T$ rises, the slip factor increases and the coefficient of friction also increases, taking a maximum value at a slip factor between 10 to 20%. When the slip factor increases beyond this point, the coefficient of friction begins to decrease.

The lateral force of the wheel tire takes a maximum value when the slip factor is zero, and it decreases as the wheel speed rises and the slip factor increases. The driving force and lateral force produced by the wheel tire against the road surface have large values for a slip factor ranging from 10 to 20%, and the vehicle can run stably by maintaining the slip factor in this range.

The slip factor of a driving wheel can be calculated from the wheel speed $v_T$ and the vehicle speed. The wheel speeds of the driving wheel and a driven wheel are detected, and the vehicle speed is calculated from the wheel speed of the driven wheel. The traction torque is controlled so that the slip factor thus obtained is below the stated value.

The above-mentioned driving force controller is intended for vehicles powered by internal combustion engines, and driving force controllers to be applied to vehicles based on electric motors, i.e., electric automobiles, are not yet known.

SUMMARY OF THE INVENTION

An object of this invention is to provide a driving force controller for an electric vehicle.

Another object of this invention is to provide a driving force controller suitable for an electric vehicle, with electric motors being provided for all driving wheels individually.

Still another object of this invention is to provide a driving force controller which does not discomfort the driver and passenger of the vehicle.

This invention achieves at least one of the above-mentioned objectives.

According to this invention, the electric motors provided for individual driving wheels are controlled so that the driving wheels work in a target slip factor range of 10–20%. The angular velocity of each driving wheel is detected, and the angular acceleration of the driving wheel is calculated from the difference of angular velocities at a certain time interval, e.g., 30 ms.

The vehicle speed is evaluated based on the comparison of the angular velocities of the driving wheels. During the acceleration of the vehicle, the vehicle speed is calculated from the lowest angular velocity among the driving wheels on the assumption that the driving wheel of the lowest velocity has the least amount of slipping. During the deceleration of the vehicle, the vehicle speed is calculated from the highest angular velocity among the driving wheels on the assumption that the driving wheel of the highest velocity has the least amount of slipping.

The slip factor of a driving wheel is calculated as a difference $\Delta v$ between the angular velocity of the driving wheel and that of the driving wheel used to determine the vehicle speed (will be termed "base angular velocity"), divided by the base angular velocity.

The vehicle driver depresses the acceleration pedal so that the vehicle runs at the intended speed. Each electric motor is supplied with a current which is regulated depending on the amount of depressing of the acceleration pedal, and the motor produces a traction torque in proportion to the supplied current. The produced traction torque is used to create the acceleration force or deceleration force.

In case the driving force of a motor is controlled directly by the command signal produced by the acceleration pedal, the associated driving wheel will slip when the operation of the acceleration pedal is varied abruptly. The driving force controller based on this invention is designed to modify the driving force command signal produced by the acceleration pedal by using the above-mentioned wheel acceleration and speed difference $\Delta v$ thereby to control the driving force of the motor so that the wheel tire maintains a proper grip force against the road surface.

According to a first embodiment of this invention, the driving force of each motor is calculated based on the formula in response to the detected wheel acceleration and speed difference $\Delta v$ of the driving wheel.

According to a second embodiment of this invention, the driving force of each motor is calculated based on fuzzy theory by making reference to preset membership functions of the wheel acceleration, speed difference and driving force of the driving wheel in response to the detected wheel acceleration and speed difference.

The inventive driving force control technique is readily applicable to an antilock brake system of a vehicle by utilization of the ability of regenerative braking of electric motors, as will be appreciated by those skilled in the art.

These and other objects and technical advantages of the present invention will become apparent from the following description of the preferred embodiments of invention taken in conjunction with the accompanying drawings.

BRIEF DESCRIPTION OF THE DRAWINGS

FIG. 5 is a table showing the control rule of fuzzy control based on another embodiment of this invention;

DESCRIPTION OF THE PREFERRED EMBODIMENTS

Embodiments of this invention will be explained in detail with reference to the drawings.

Figure 2:
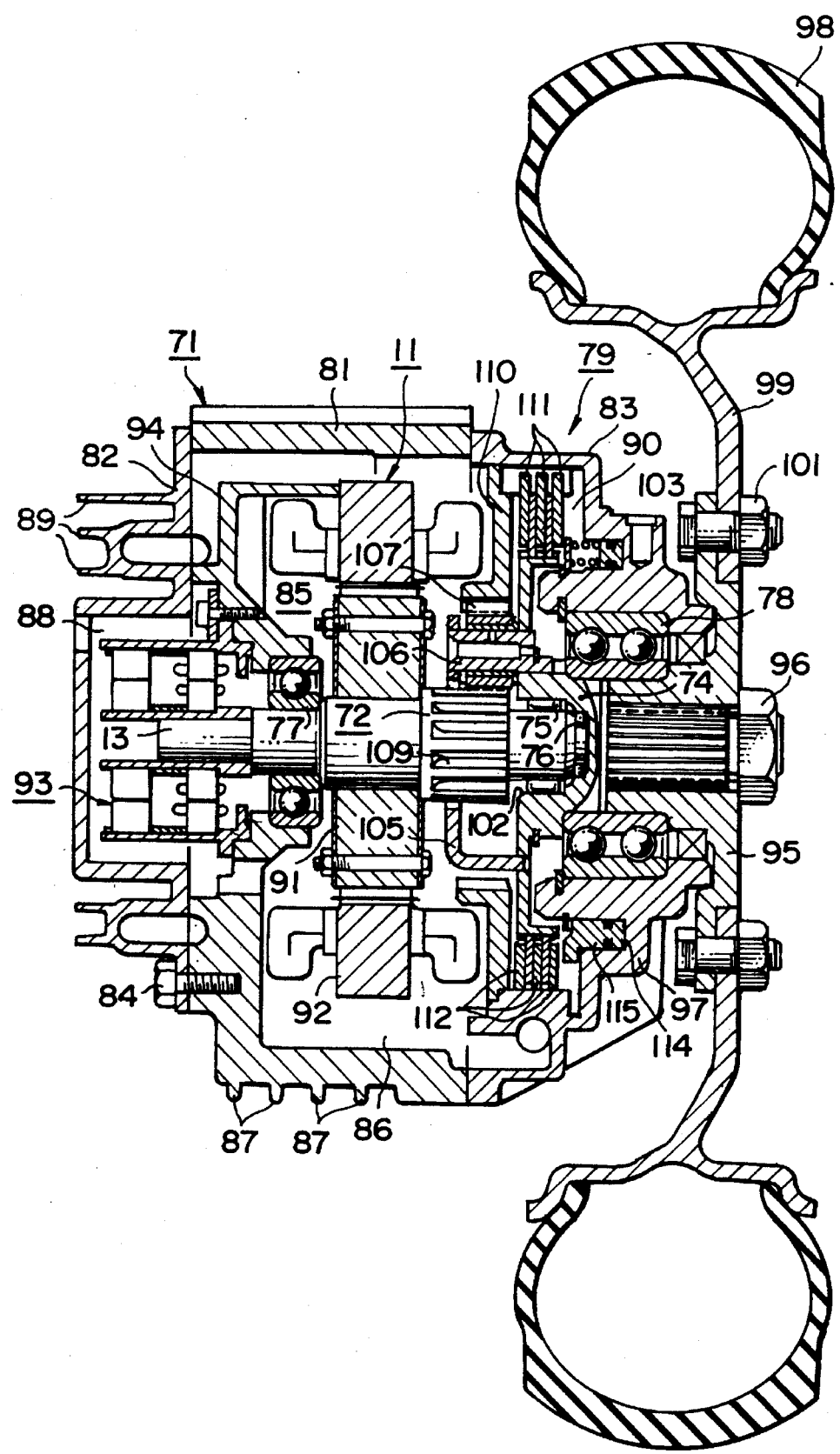
FIG. 2 is a cross-sectional diagram of the driving wheel based on an embodiment of this invention.

FIG. 2 shows the cross section of a driving wheel of the electric vehicle based on this invention. In the figure, an electric motor 11 and a planetary gear reduction mechanism 72 are accommodated in a casing 71. The motor has its rotor shaft 13 supported at one end thereof by bearings 75 and 76 fitted in a hollow of an output shaft 74. The coaxially-coupled rotor shaft 13 and output shaft 74 are supported at their ends by bearings 77 and 78. Indicated by 79 is a disc brake section.

The casing 71 is made up of a main frame 81 and side walls 82 and 83 connected by a number of bolts 84. The main frame 81 forms a room 85 of a virtually circular cross section and an oil basin 86, which communicates with the room 85, at the bottom. The external surface of the main frame 81 has a formation of multiple cooling fins 87. The left side wall 82 forms a room 88 of a circular cross section which is smaller in diameter than the room 85, and has a formation of multiple cooling fins 89 on its external surface. The right side wall 83 forms a room 90 of a circular cross section which is equal in diameter to the room 85.

Accommodated in the main frame room 85 is the electric motor 11, with its rotor shaft 13 being supported rotatably by a bearing 77 which is fitted on the flange section 94 of the main frame 81. The motor 11, which is a brushless d.c. motor, has its rotor 91 secured to the rotor shaft 13 and its stator core 92 secured to the interior wall of the room 85.

The left side wall room 88 houses a motor (wheel) speed sensor 93 such as an optical encoder or resolver for detecting the rotational speed of the wheel. The wheel speed sensor 93 has its moving part secured to the left end of the rotor shaft 13 and its stationary part secured to the flange section 94 of the main frame 81. The wheel speed sensor 93 outputs signals according to rotational frequency of the motor 11.

The right side wall room 90 houses the output shaft 74, which is coupled with a wheel hub 95 in spline engagement and secured by means of a nut 96. The output shaft 74 coupled with the wheel hub 95 is supported rotatably by a bearing 78 which is fitted on a flange section 97. A wheel 99 provided with a tire 98 is fixed to the wheel hub 95 by means of bolts and nuts 101.

The output shaft 74 has at its left end a formation of a coaxial hollow section 102 of a circular cross section and a radial flange section 103. One end of the rotor shaft 13 is inserted to the output shaft 74 and supported in it by a bearing 75 in the radial direction and by a thrust bearing 76 in the axial direction so that these shafts can rotate relatively.

A carrier 105 is fitted at the root section of the flange 103 and a number of pins 106, with planetary gears 107 being supported thereon rotatably, are mounted between the carrier and flange at a constant radial interval. The planetary gears 107 are located to engage with a sun gear 109 formed on the rotor shaft 13 and a ring gear 110 which is fixed on the interior wall of the right side wall 83. The carrier 105, pins 106, planetary gears 107, sun gear 109 and ring gear 110 in combination constitute the planetary gear reduction mechanism 72 which connects the rotor shaft 13 and the output shaft 74.

At the circumferential section of the flange 103, there are mounted brake discs 111 and 112 in spline engagement so that they can slide only in the axial direction. On the interior wall of the right side wall 83, there are mounted three pieces of brake discs 112 in spline engagement so that they can slide only in the axial direction. Brake cylinders 114 are coaxially fitted on the circumferential flange section 97 of the right side wall 83, with pistons 115 being located to confront the side surface of the rightmost brake disc 112.

Figure 1:
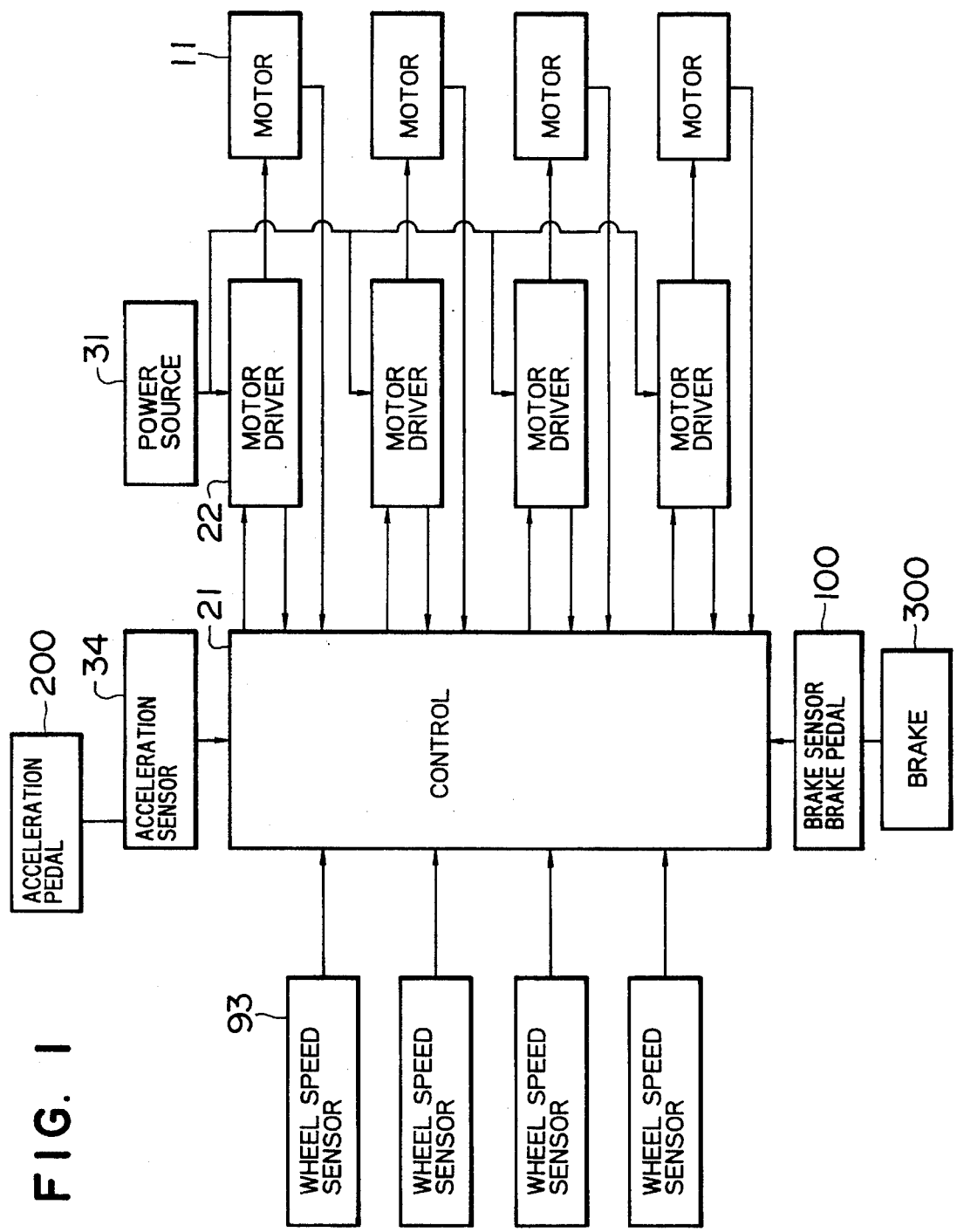
FIG. 1 is a block diagram of the driving force controller based on an embodiment of this invention.

FIG. 1 shows in block diagram form the driving force controller of the electric vehicle based on an embodiment of this invention. In the figure, reference numeral 11 denotes electric motors provided for the driving wheels individually, 21 is a controller and 22 are motor drivers correspondingly provided for the electric motors 11. Each motor 11 is a wheel motor which rotates a driving wheel directly by being supplied with a drive current from a power source 31 under control of the associated motor driver 22. Each motor driver 22 sends the signals of the motor temperature and motor rotational direction to a controller 21.

Indicated by 34 is an acceleration pedal sensor which detects the degree of depressing of the acceleration pedal 200, and 93 are wheel speed sensors which detect the wheel speeds $V_T$ of individual wheels. The wheel speed sensor 93 produces a signal which represents the number of revolutions of the wheel in unit time, as mentioned previously, and the signal is sent to the controller 21, by which it is converted to indicate the tangential wheel speed on the road surface.

The controller 21 consists of a digital computation device such as a microprocessor and memory devices including RAM and ROM, and it determines the driving forces of individual driving wheels through the computation process, which will be explained in the following, and issues driving force commands to the corresponding motor drivers 22. The controller 21 includes an A/D converter (not shown) for converting the analog signals from the acceleration pedal sensor 34 and wheel speed sensors 93 into digital data.

Indicated by 100 is a brake operation sensor incorporated in the brake system (not shown), and it detects the activation of the brake system and sends a command to the controller 21 so that the driving force controller operates as an antilock brake system.

The motors 11 are paired with the four driving wheels and supplied with drive currents of prescribed values from the power source 31 through the respective motor drivers 22 as mentioned previously. Each motor driver 22 is a switching circuit, supplying a drive current to the associated motor 11 in response to the driving force command from the controller 21.

The motors 11 rotate the driving wheels and the vehicle runs by the driving forces exerted by the wheels. The wheel speed $v_T$ is detected by the wheel speed sensor 93 which is located at the rotor shaft of the motor.

This invention is applied not only to vehicles in which each driving wheel is equipped with an electric motor, but is also applicable to vehicles in which one motor drives two wheels and to vehicles in which an internal combustion engine cooperates the wheels.

Next, the operation of the electric vehicle arranged as described above will be explained.

Figure 3A:
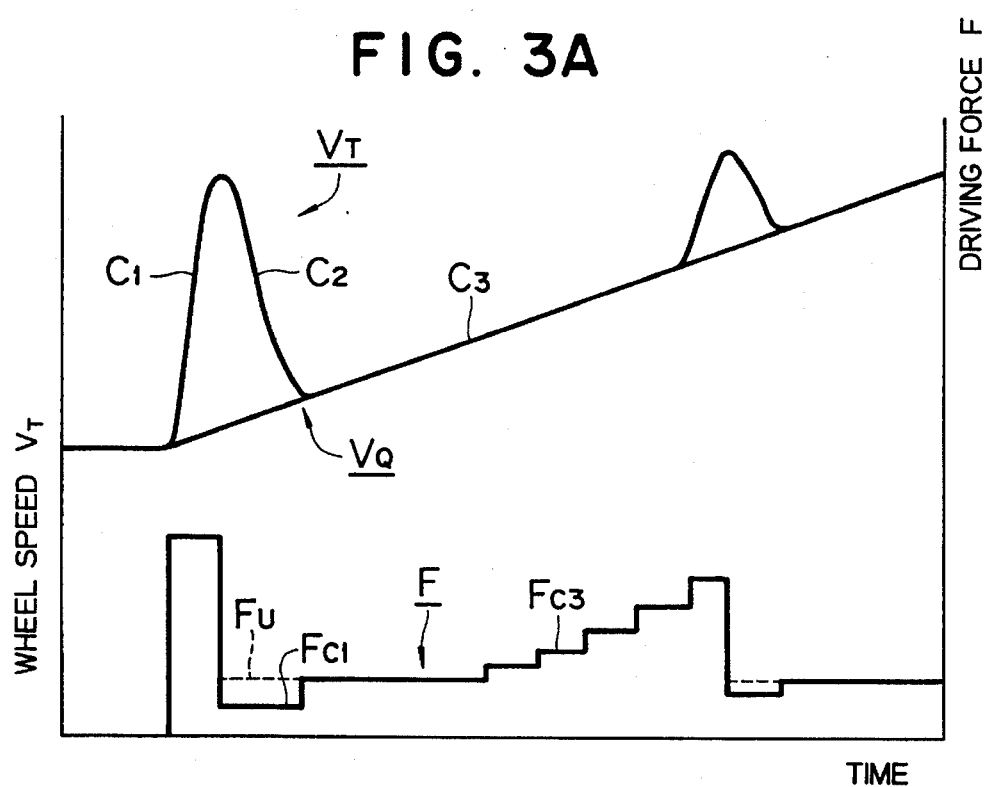
FIG. 3A is a time chart showing the variation of the wheel speed and driving force of a driving wheel in the driving force control mode.

FIG. 3A is a time chart showing the operation of the electric vehicle of this embodiment of invention. By maintaining the slip factor between the wheel tire and the road surface in a range from 10 to 20%, the maximum driving force can be exerted as mentioned previously. This invention is designed to calculate the optimal driving force of each driving wheel based on the wheel speed $v_T$ without calculating the slip factor, and runs the vehicle through the exertion of the calculated driving force of the driving wheel.

The wheel speed $v_T$ is detected by the wheel speed sensor 93 located at the rotor shaft 13 of the motor 11 of each driving wheel, and the wheel speed signal produced by the sensor is sent to the controller 21, in which the signal is rid of noises through a filtering process conducted in a software manner. The detected wheel speed is averaged as a result of the filtering process.

Next, the controller 21 calculates the wheel acceleration $a_T$ from a change in the wheel speed $v_T$ detected at a 30 ms interval, and then calculates the driving force which has been used to accelerate the driving wheel at that wheel acceleration $a_T$ in the past 30 ms period (this driving force will be termed "previous driving force $F_B$"). The previous driving force $F_B$ is evaluated by integrating the value of drive current supplied to the motor 11. Alternatively, the driving force $F_C$ is evaluated as explained in the following and stored in a register of the controller 21 so that it is used as the previous driving force $F_B$ for the subsequent calculation.

Slipping of a driving wheel can be detected from the difference of the wheel speed $v_T$ from the vehicle speed. In this case, a quasi vehicle speed $v_Q$ is calculated from the angular velocity of the driving wheel, instead of using the absolute vehicle speed, and the speed difference $\Delta v$ between the quasi vehicle speed $v_Q$ and wheel speed $v_T$ is calculated as follows.

$$\Delta v = v_T - v_Q \quad (1)$$

For a vehicle having four driving wheels rotated by individual motors, as in this embodiment, when the vehicle driver depresses the acceleration pedal to accelerate the vehicle or depresses the brake pedal to decelerate the vehicle, all driving wheels rotate at different wheel speeds depending on the weight balance of the vehicle and the coefficient of friction between each wheel tire and the road surface. Since a driving wheel having the least slipping will exhibit the lowest wheel speed during the acceleration and the highest wheel speed during the deceleration among all driving wheels, each case being nearest to the vehicle speed, the quasi vehicle speed $v_Q$ is determined by selecting the smallest $v_T$ value out of all wheel speeds during the acceleration or the largest $v_T$ value during the deceleration.

For this vehicle speed determination process, the controller 21 updates the wheel speed register in response to the detection of the wheel speed of each driving wheel. The quasi vehicle speed $v_Q$ has a certain upper limit for dealing with the case in which all wheel speeds are abnormally high when all driving wheels slip during the acceleration. In addition, the controller 21 compares the immediate quasi vehicle speed $v_{Q2}$ with the previous quasi vehicle speed $v_{Q1}$, and if their difference is greater than a certain value (e.g., 1g in terms of acceleration), it negates the immediate quasi vehicle speed $v_{Q2}$ and determines the quasi vehicle speed $v_Q$ by adding a constant value to the previous quasi vehicle speed $v_{Q1}$ as follows.

$$v_Q = v_{Q1} + \alpha \quad (2)$$

where α is a constant.

Next, the controller 21 determines the grade of slipping based on the polarity and value the speed difference $\Delta v$. If the speed difference $\Delta v$ is positive and greater than a preset value β (e.g., 1g in terms of acceleration), the driving wheel in attention is determined to be in the first slip state $C_1$.

The maximum driving force $F_U$ which can be exerted by a driving wheel against the road surface is determined from the loading of the driving wheel against the road surface and the coefficient of friction between the wheel tire and the road surface, and this is the optimal driving force for that drive condition. If a driving force F greater than the optimal driving force $F_U$ is transmitted to the driving wheel, slipping of the first slip state $C_1$ will occur.

The driving force $F_{C1}$ to be produced by the motor must be determined in consideration of kinetic energy possessed by the rotating driving wheel. In the first slip state $C_1$, this driving force $F_{C1}$ is smaller than the driving force $F_A$ which would be produced directly in response to the operation of the acceleration pedal by the vehicle driver. The difference of these driving forces, i.e., $F_{A-C} = F_A - F_{C1}$, is the modification driving force to be considered in order to prevent the wheel slipping.

For the lessening of slipping and the recovery of gripping of the road surface by the driving wheel, the driving force $F_{C1}$ to be produced by the motor is the optimal driving force $F_U$ subtracted by the adjustment driving force $\Delta F$ of a prescribed value as follows.

$$F_{C1} = F_U - \Delta F \quad (3)$$

The adjustment driving force $\Delta F$ is calculated from the radius of wheel $r_T$, the speed difference $\Delta_v$ due to slipping, the time length $\Delta t$ needed to stop the slipping, and the inertia of the whole driving wheel assembly including the motor, as follows.

$$\Delta F = (I/r_T^2) \cdot (\Delta v/\Delta t) \quad (4)$$

or $$\Delta F = \gamma \cdot \Delta v \quad (5)$$

where $$\gamma = I/r_T^2 \cdot \Delta t \text{(constant)} \quad (6)$$

The controller 21 issues a command signal indicative of the calculated driving force $F_{C1}$ to the motor driver 22. The motor driver 22 adjusts the amount of drive current supplied from the power source 31 and applies the resulting drive current to the motor 11, which then produces the driving force $F_{C1}$.

The optimal driving force $F_U$ exerted by the driving wheel against the road surface is calculated from the previous driving force $F_B$ and an excessive driving force $F_S$ as follows.

$$F_U = F_B - F_S \quad (7)$$

The excessive driving $F_S$, which does not contribute to the acceleration of the driving wheel, is given as follows.

$$F_S = \delta \cdot a_T \quad (8)$$

where the value of $\delta$ is determined from the torque $T_T$ of driving wheel created by the driving force $F_S$, the wheel radius $r_T$, the wheel acceleration $a_T$, and the inertia I of the whole driving wheel assembly including the motor, as follows.

$$T_T \cdot r_T = I \cdot a_T \quad (9)$$

$$T_T = F_S r_T \quad (10)$$

From equations (4) and (7), $$F_S \cdot r_T^2 = I \cdot a_T$$

$$F_S = (I/r_T^2) \cdot a_T \quad (11)$$

Accordingly, $$\delta = (I/r_T^2) \text{ (constant)} \quad (12)$$

In this manner, the command driving force $F_{C1}$ to be instructed to the motor driver 22 in the first slip state $C_1$ is calculated.

The memory of the controller 21 has a record of the $\gamma$ values for the equation (6) and the $\gamma$ values for the equation (12), and these values are read out for the calculation of the optimal driving force FU and command driving force $F_{C1}$.

When the vehicle runs in accordance with the driving force $V_{C1}$, the wheel acceleration decreases gradually and the wheel slipping begins to cease. When the acceleration $a_T$ turns to negative, the driving wheel enters the second slip state $C_2$ shown in FIG. 3A. The driving force $F_{C1}$ is calculated in the same manner in this slip state.

When the wheel slipping ceases and the wheel speed $v_T$ falls to the quasi vehicle speed $v_Q$, the driving wheel enters the third slip state $C_3$. In this state, the driving force $F_{C3}$ is increased in steps gradually from the initial value of the optimal driving force $F_U$ as shown in FIG. 3A. It is desirable to increase the driving force $F_{C3}$ progressively along the curve of a quadratic function so that wheel slipping does not recur.

After the driving force of each driving wheel has been calculated depending on the individual slip state, the driving forces of the right and left driving wheels are compared. If there is a great difference between them, the larger driving force is reduced in order to improve the running stability of the vehicle. In the case of improving the turning stability of the vehicle in addition, the driving forces of all driving wheels are compared, and the driving forces of three driving wheels are reduced in relation with the smallest driving force. This control function carried out by the controller 21 is effective only when the steering wheel is turned beyond a certain value or when the lateral acceleration of the vehicle exceeds a certain value.

Consequently, each motor driver 22 receives the command signal of the driving force which has been modified and finally determined by the controller 21.

Figure 4:
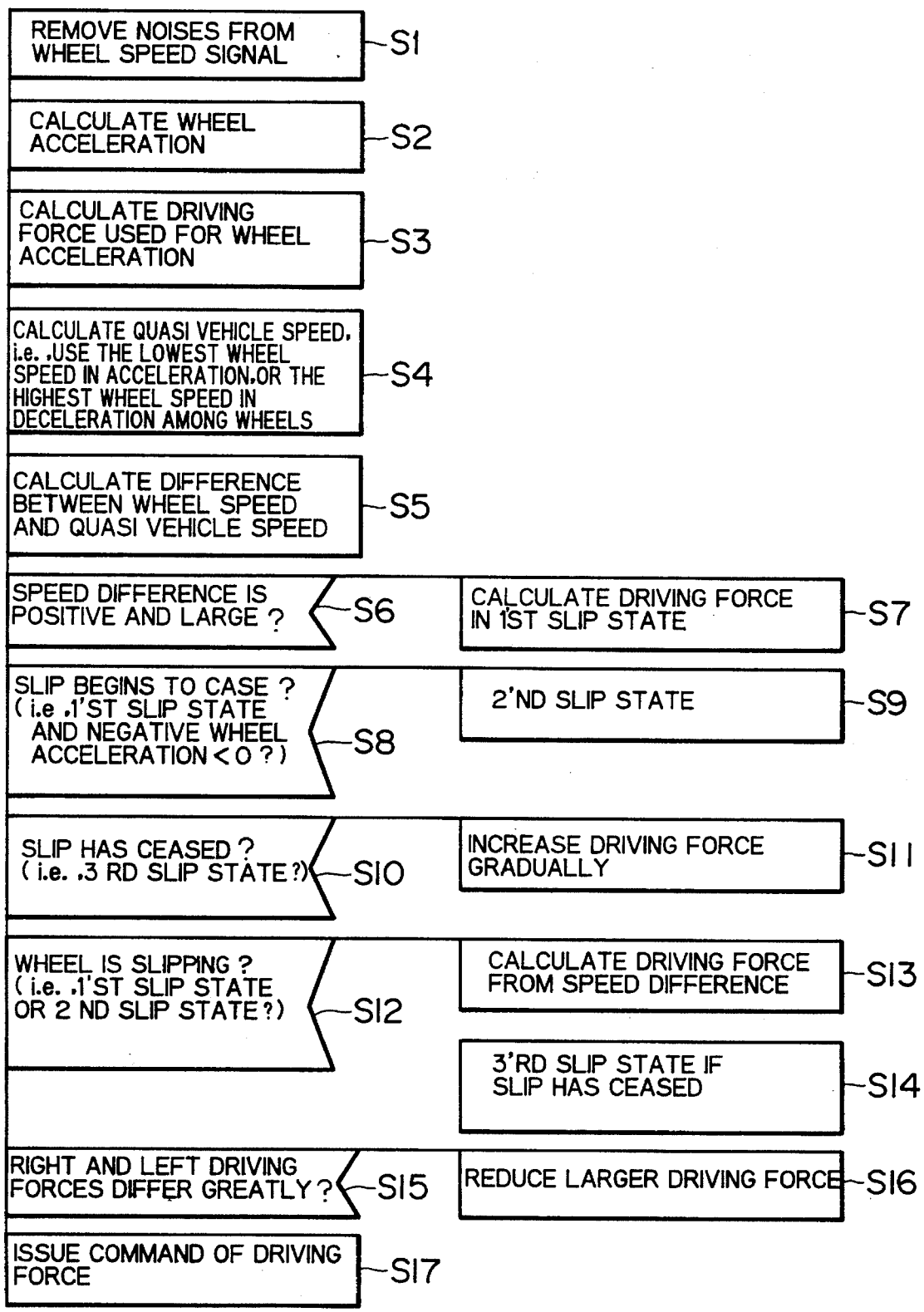
FIG. 4 is a flowchart showing the operation of the driving force controller of this embodiment.

FIG. 4 shows in flowchart form the operation shown in FIG. 3A of the electric vehicle based on this embodiment of invention.

Step S1 removes noises from the signal of wheel speed $v_T$.

Step S2 calculates the wheel acceleration $a_T$.

Step S3 calculates the previous driving force $F_B$ which has been used to accelerate the driving wheel.

Step S4 calculates the quasi vehicle speed $v_Q$, which is the lowest wheel speed among all driving wheels during the acceleration or the highest wheel speed during the deceleration.

Step S5 calculates the speed difference $\Delta v$ between the wheel speed $v_T$ and the quasi vehicle speed $v_Q$.

Step S6 tests whether or not the speed difference $\Delta v$ is positive and greater than the preset value.

Step S7 calculates the optimal driving force $F_U$ if the speed difference $\Delta v$ is positive and greater than the preset value, i.e., the the first slip state $C_1$.

Step S8 judges whether the wheel slipping becomes to cease by testing whether the driving wheel is in the first slip state $C_1$ and the wheel acceleration $a_T$ is smaller than zero. If the wheel acceleration $a_T$ is smaller than zero, the control sequence proceeds to step S9.

Step S9 makes the judgement of the second slip state $C_2$.

Step S10 judges whether or not the wheel slipping has ceased, i.e., the third slip state $C_3$.

Step S11 increases the driving force $F_{C3}$ gradually if the driving wheel is in the third slip state $C_3$ following the subsidence of slipping.

Step S12 judges whether or not the driving wheel is slipping, i.e., whether or not it is in the first slip state $C_1$ or second slip state $C_2$.

Step S13 calculates the adjustment driving force $\Delta F$ from the speed difference $\Delta v$ and calculates the driving force $F_{C1}$ from the driving force $F_U$ and adjustment driving force $\Delta F$.

Step S14 judges the driving wheel to be in the third slip state $C_3$ when the speed difference $\Delta v$ is virtually zero and the wheel slipping has ceased.

Step S15 tests whether or not the difference between the driving forces of the right and left driving wheels is large.

Step S16 reduces the larger driving force if the difference between the driving forces of the right and left driving wheels is large.

Step S17 delivers the command signals of the driving force $F_{C1}$ or $F_{C3}$, which have been calculated in steps S11 or S13, to the motor driver 22.

Next, the second embodiment of this invention will be explained.

Also in this embodiment, the wheel speed sensors 93 detect the wheel speeds of the respective driving wheels and deliver the signals to the controller 21, which then removes noises from the signals through the averaging process.

Next, the controller 21 calculates the wheel acceleration $a_T$ from the wheel speed $v_T$ for each driving wheel, and calculates the previous driving force $F_B$ which has been used to accelerate the driving wheel at $a_T$. The controller 21 judges as to whether or not each driving wheel is slipping based on the speed difference $\Delta v$ between the wheel speed $v_T$ and the quasi vehicle speed $v_Q$.

Also in this embodiment, the quasi vehicle speed $v_Q$ is determined by selecting the lowest wheel speed during the acceleration or the highest wheel speed during the deceleration from among those of all driving wheels.

Next, the controller 21 calculates the driving force $F_F$ from the wheel acceleration $a_T$ and speed difference $\Delta v$ based on fuzzy theory.

FIG. 5 shows the control rule of fuzzy theory used in this embodiment. The driving force $F_F$ of this embodiment compares to the $F_{C1}$ of the preceding embodiment.

As shown in the table of FIG. 5, the wheel acceleration $a_T$ is ranked in five levels and the speed difference $\Delta v$ is ranked in three levels to allow 15 combinations, and a driving force $F_F$ of one of six levels is selected in response to the entry of a pair of wheel speed and speed difference. Specific values of the contents of this table are as follows.

Wheel accelerations symbolized by ++, +, 0, −, and —— have values 14, 7, 0, −7 and −14 m/s², respectively.

Speed difference $\Delta v$ symbolized by ++, +, and 0. have values 3, 1.5 and 0 km/h, respectively.

Driving force $F_F$ symbolized by ++, +, 0, −, —— and ——— have values 12, 6, 0, −6, −12 and −18 kgf, respectively.

Figure 6A:
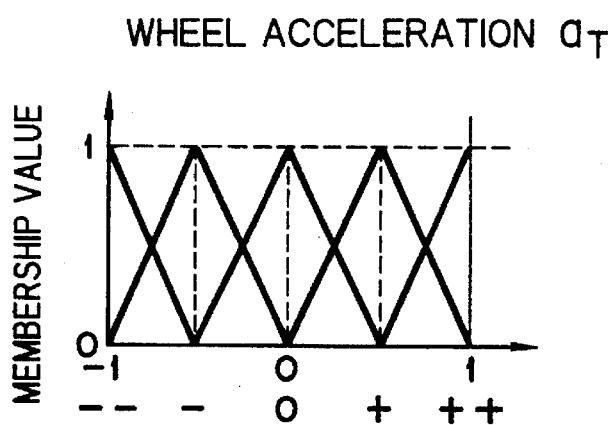
FIG. 6A is a diagram showing the membership function of the wheel acceleration.
Figure 6B:
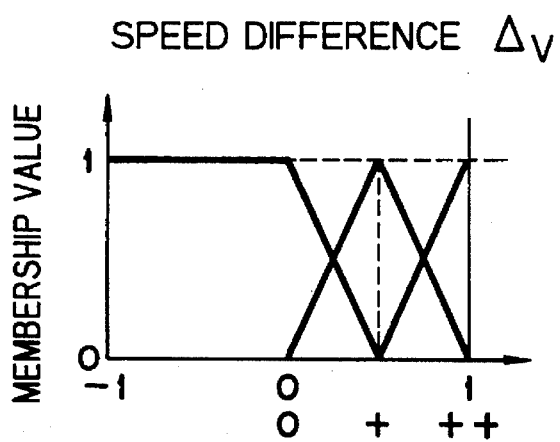
FIG. 6B is a diagram showing the membership function of the speed difference.
Figure 6C:
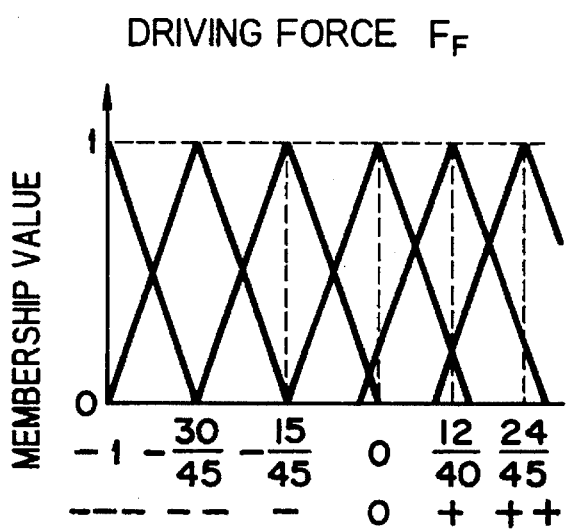
FIG. 6C is a diagram showing the membership function of the driving force.
Figure 7:
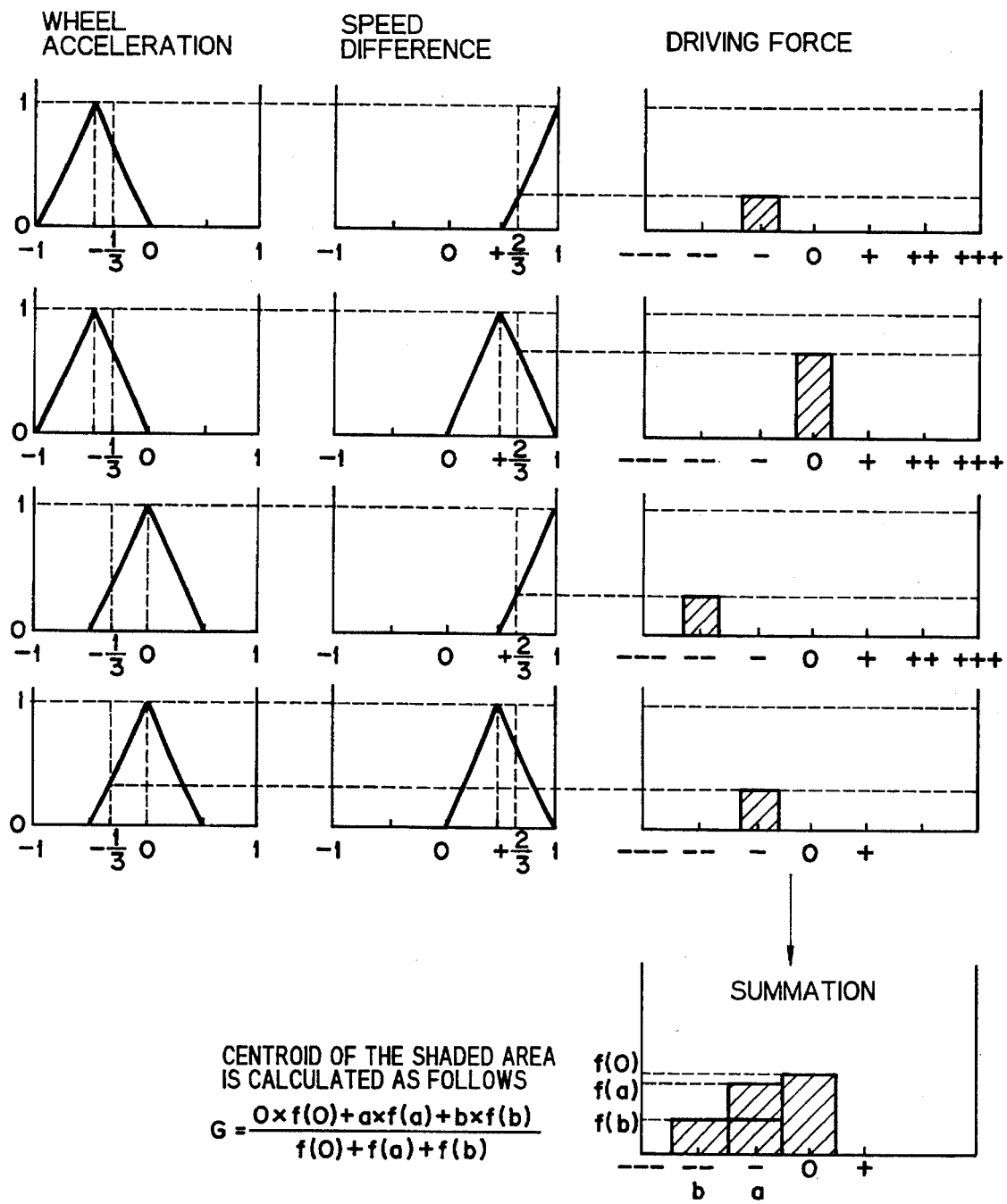
FIG. 7 is a set of diagrams used to explain the fuzzy theory used in this embodiment.

FIGS. 6A to 6C show the membership functions of the wheel acceleration $a_T$, speed difference $\Delta v$ and driving force $F_F$. This embodiment adopts the min-addition-centriod method in the fuzzy theory, and FIG. 7 shows the results of calculation based on this method for the case of the wheel acceleration and speed difference having the values of $-\frac{1}{3}$ and $+\frac{2}{3}$, respectively.

The driving forces $F_F$ for the possible wheel accelerations $a_T$ and speed differences $\Delta v$ are calculated in advance and stored in the memory of the controller 21. The controller 21 calculates the wheel acceleration and speed difference from the detected wheel speed, and reads out the corresponding driving force from the memory.

Next, the antilock brake system accomplished by application of the driving force control of the preceding embodiment will be explained.

Figure 3B:
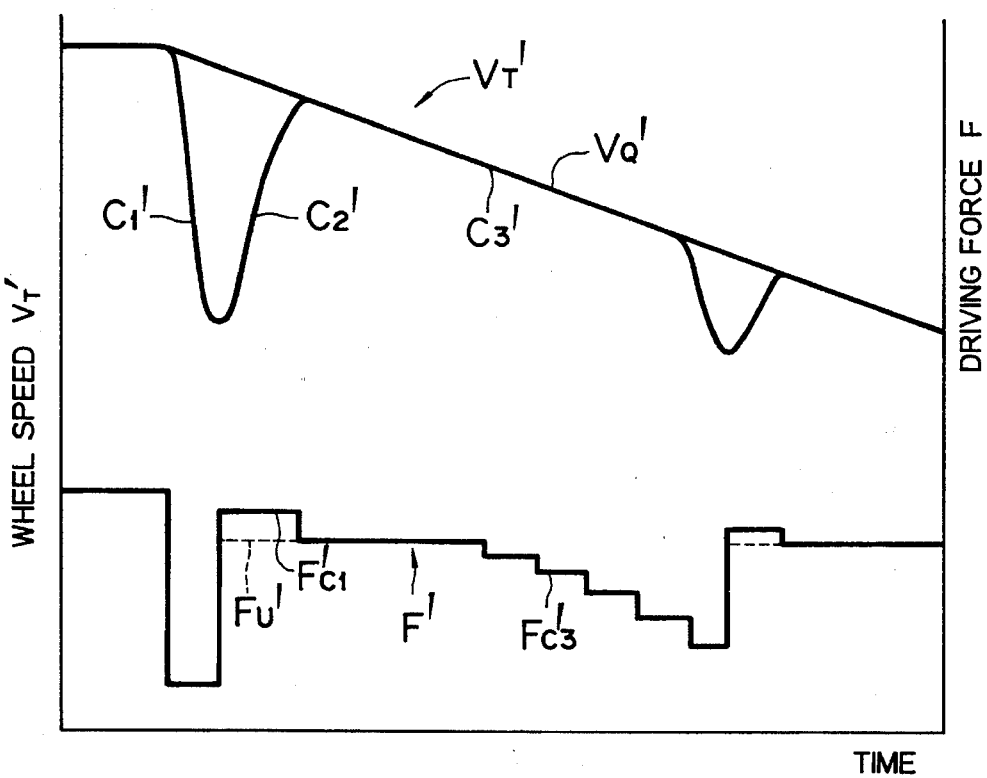
FIG. 3B is a time chart showing the variation of the wheel speed and driving force of a driving wheel in the antilock brake control mode.

FIG. 3B is a time chart showing the variation of the wheel speed and the driving force F' transmitted to the driving wheel when the vehicle driver applies the brake. For the easiness of explanation, the wheel speed variation curve of FIG. 3B is symmetrical with that shown in FIG. 3A with respect to the initial speed, i.e., same amount of variation in opposite polarity at each time point. Similarly, the driving force of FIG. 3B varies in a symmetrical fashion relative to that shown in FIG. 3A.

When the vehicle driver depresses the brake pedal, a brake sensor 100 produces a signal and sends it to the controller 21. On receiving the signal, the controller 21 controls all motors 11 so that the driving wheels do not lock.

In case the speed difference $\Delta v$ is small, the controller 21 judges whether or not the wheel is in the first slip state $C_1$ (or $C_1'$) at present. In the case of the first slip state $C_1$ (or $C_1'$) at present, the controller 21 alters the judgement to be the third slip state $C_3$ (or $C_3'$), and starts a timer.

In the case of the third slip state $C_3$ of the traction control mode, the controller 21 makes the judgement of the lessening of slipping and increases the driving force $F_{C3}$ gradually in steps from the initial value of the previous driving force $F_F$ as shown in FIG. 3A. In this embodiment, the increment of the driving force $F_{C3}$ is increased gradually along the curve of a quadratic function so that slipping does not recur.

In the case of the third slip state $C_3'$ of the antilock brake control mode, the controller 21 makes the judgement of the lessening of slipping and reduces the driving force $F_{C3}$ gradually.

When the timer reaches the preset count value since the entry to the third slip state $C_3$ (or $C_3'$), the controller 21 terminates the traction control or antilock brake control, and selects the driving force $F_A$ which directly reflects the degree of depressing of the acceleration pedal in precedence over the driving force $F_F$ based on the fuzzy control of the preceding embodiment. In other words, the motor drivers 22 are operated in accordance with the acceleration pedal sensor signal without any modification.

In the antilock brake control mode, the commands of driving forces $F_F$, $F_{C3}$ and $F_A$ are given to the motor drivers 22 while the driving wheels are nearly in a locked state or in a very low speed. This operating condition can possibly damage the motor since the drive current may be supplied only to a single phase. In dealing with this matter, the command driving forces $F_F$, $F_{C3}$ and $F_A$ have upper limits.

The driving force (regenerative braking force) $F_A$ which reflects the degree of depressing of the acceleration pedal (brake pedal) is compared with the driving force $F_F$ based on the fuzzy control, and the driving force $F_A$ takes precedence over $F_F$ when $F_A$ is smaller than $F_F$ in the traction control mode or the regenerative braking force $F_A$ takes precedence over $F_F$ when $F_A$ is greater than $F_F$ in the antilock brake control mode. The driving force $F_F$ based on the fuzzy control is instructed to the motor driver 22 when $F_A$ is greater than or equal to $F_F$ in the traction control mode, or when $F_A$ is smaller than or equal to $F_F$ in the antilock brake control mode.

The calculated driving forces of the right and left driving wheels are compared, and if their difference is large, the larger driving force is reduced in order to improve the running stability. In order to avoid a sharp change of driving force, the calculated driving force is smoothed before it is compared with that of the wheel on the other side.

Figure 8A:
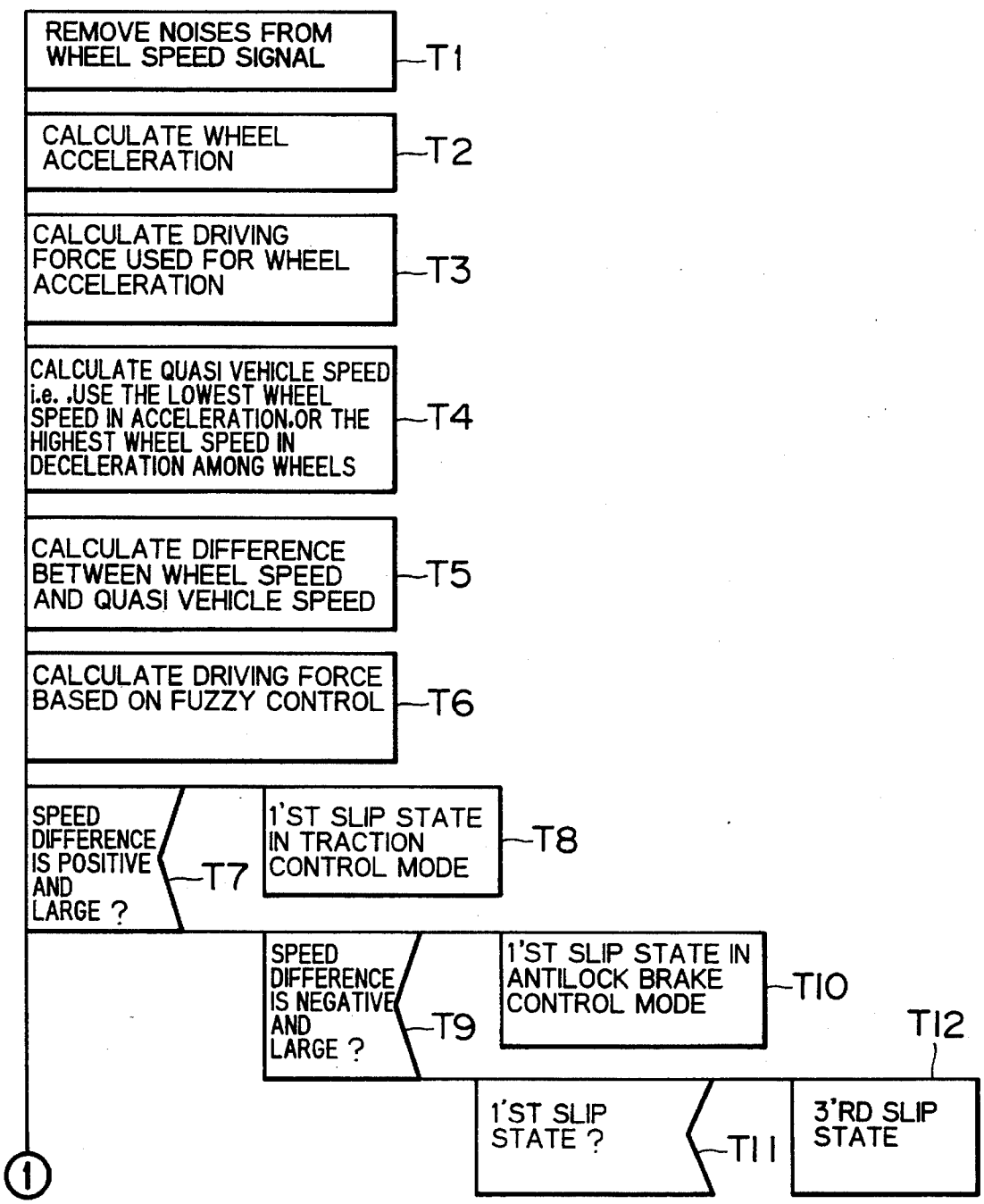
FIGS. 8A and 8B are flowcharts showing the operation of the driving force and antilock brake controller based on another embodiment of this invention.
Figure 8B:
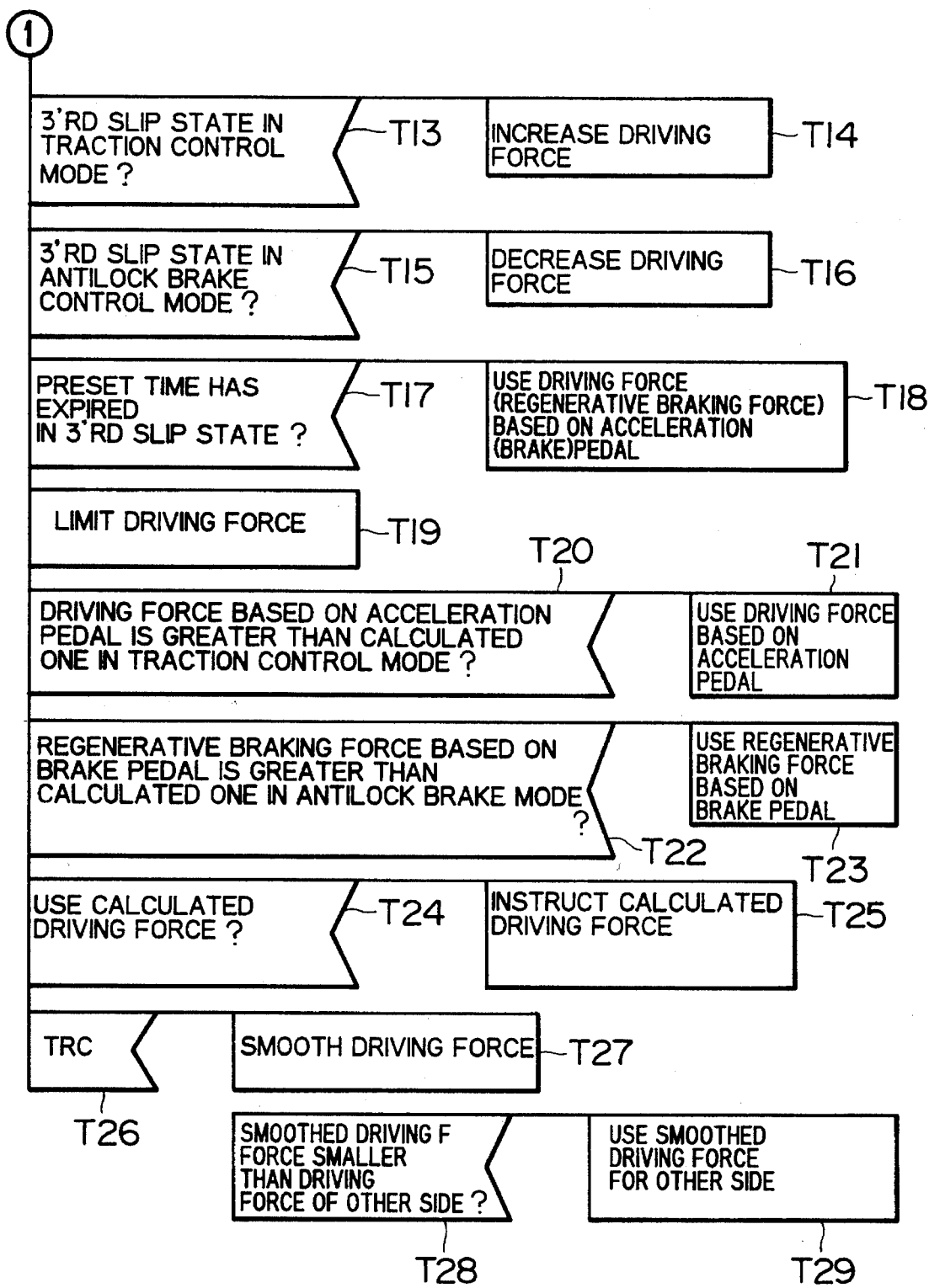

FIGS. 8A and 8B show in flowchart the operation of the electric vehicle based on this invention having both the traction control and antilock brake control functions.

Step T1 removes noises from the signal of wheel speed $v_T$.

Step T2 calculates the wheel acceleration $a_T$.

Step T3 calculates the previous driving force $F_B$ which has been used to accelerate the driving wheel.

Step T4 calculates the quasi vehicle speed $v_Q$, which is the lowest wheel speed among all driving wheels during the acceleration or the highest wheel speed during the deceleration.

Step T5 calculates the speed difference $\Delta v$ between the wheel speed $v_T$ and the quasi vehicle speed $v_Q$.

Step T6 calculates the driving force $F_F$ based on the fuzzy theory.

Step T7 tests whether or not the speed difference $\Delta v$ is positive and greater than the preset value. If the speed difference is positive and large, the control sequence proceeds to step T8, or otherwise proceeds to step T9.

Step T8 makes the judgement of the first slip state $C_1$ in the traction control mode.

Step T9 tests whether or not the speed difference $A_v$ is negative and greater than the preset value. If the speed difference is negative and large, the control sequence proceeds to step T10, or otherwise proceeds to step T11.

Step T10 makes the judgement of the first slip state $C_1$ in the antilock brake control mode.

Step T11 tests whether or not the driving wheel is in the first slip state $C_1$ at present. In the case of the first slip state, the control sequence proceeds to step T12.

Step T12 alters the judgement to be the third slip state $C_3$.

Step T13 tests whether or not the driving wheel is in the third slip state $C_3$ in the traction control mode. In the case of the third slip state in the traction control mode, the control sequence proceeds to step T14.

Step T14 makes the judgement of the subsidence of slipping and increases the driving force $F_{C3}$ gradually.

Step T15 tests whether or not the driving wheel is in the third slip state $C_3$ in the antilock brake control mode. In the case of the third slip state in the antilock brake control mode, the control sequence proceeds to step T16.

Step T16 makes the judgement of the subsidence of slipping and reduces the driving force $F_{C3}$ gradually.

Step T17 tests whether or not the timer has reached the preset count value following the entry to the third slip state $C_3$. When the timer reaches the preset count value, the control sequence proceeds to step T18.

Step T18 terminates the traction control or antilock brake control, and selects the driving force (regenerative braking force) $F_A$ which directly reflects the degree of depressing of the acceleration pedal (brake pedal) in precedence over the driving force $F_F$ based on the fuzzy control.

Step T19 limits the command driving forces $F_F$, $FC_3$ and $F_A$ to the motor driver 22 at the preset upper limit.

Step T20 compares the driving force $F_F$ based on the fuzzy control with the driving force $F_A$ based on the acceleration pedal in the traction control mode. If $F_F$ is greater than $F_A$ the control sequence proceeds to step T21.

Step T21 selects the driving force $F_A$ of acceleration pedal in precedence over the driving force based on the fuzzy control.

Step T22 compares the regenerative braking force based on the brake pedal with the driving force $F_F$ based on the fuzzy control in the antilock brake control mode. If $F_A$ is greater than $F_F$ the control sequence proceeds to step T23.

Step T23 selects the regenerative braking force $F_A$ based on the brake pedal in precedence over the driving force based on the fuzzy control.

Step T24 tests whether or not the driving force $F_F$ based on the fuzzy control is selected in precedence over the $F_A$ in step T21 or T23. If the driving force based on the fuzzy control is selected, the control sequence proceeds to step T25.

Step T25 selects the driving force $F_F$ based on the fuzzy control for the command to the motor driver 22.

Step T26 tests whether or not the control mode is the traction control mode. In the case of the traction control mode, the control sequence proceeds to step T27.

Step T27 smooths the driving forces $F_F$, $F_{C3}$ and $F_A$.

Step T28 compares the smoothed driving force with that of the wheel on the other side. If the driving force of the other side is greater than the smoothed driving force, the control sequence proceeds to step T29.

Step T29 makes the driving force of the other side equal to the smoothed driving force.

Although in the foregoing first and second embodiments each driving wheel is provided with a motor individually and the driving force is calculated for each motor separately, the power transmission system may be arranged such that the torque produced by a motor is distributed among driving wheels through a differential gear.

The above-mentioned TRC and ABS control systems are applied to an electric vehicle shown in U.S. Pat. No. 5,148,883 and a hybrid vehicle which include an electric engine and a fuel engine shown in U.S. Pat. No. 4,533,011. The above-mentioned U.S. Pat. Nos. 5,148,883 and 4,533,011 are hereby incorporated herein by reference.

The present invention has been described in detail, it should be understood that various changes, substitutions and alternations can be made hereto without departing from the spirit and scope of the present invention as defined by the appended claims.

I claim:

1. A driving force controller for an electric vehicle, comprising:
   (a) electric motors for driving respective driving wheels of said electric vehicle;
   (b) determination means for determining whether each of the respective driving wheels are substantially slipping;
   (c) means for detecting a first wheel speed ($V_Q$) of a first driving wheel determined to not be substantially slipping and a second wheel speed ($V_T$) of a second driving wheel determined to be substantially slipping;
   (d) means for calculating a difference ($\Delta V = V_T - V_Q$) between said first wheel speed ($V_Q$) and said second wheel speed ($V_T$);
   (e) means for calculating a wheel acceleration ($a_T$) of said second driving wheel in accordance with said second wheel speed ($V_T$);
   (f) means for calculating a first driving force ($F_B$) which has been produced by a respective one of said electric motors; to accelerate said second driving wheel at said wheel acceleration ($a_T$) in a predetermined past time interval with respect to a current time;
   (g) means for calculating a second driving force ($F_S$) which is an excessive component of said first driving force ($F_B$) that does not contribute to acceleration of said second driving wheel;
   (h) means for calculating a third driving force ($F_U = F_B - F_S$), which is an optimal driving force to be produced by said respective one of said motors to drive said second driving wheel against a road surface, by subtracting said second driving force ($F_S$) from said first driving force ($F_B$);
   (i) means for calculating a fourth driving force ($\Delta F$) for adjusting a driving force to be applied to said second driving wheel;
   (j) means for calculating a fifth driving force ($F_{C1} = F_U - \Delta F$) by subtracting said fourth driving force ($\Delta F$) from said third driving force ($F_U$); and
   (k) means for controlling said respective one of said motors to drive said second driving wheel at said fifth driving force ($F_{C1}$).

2. A driving force controller according to claim 1, wherein said second driving force ($F_S$) is calculated according to the following formula $$F_S = (I/r_T^2) \cdot a_T$$

where I is an inertia of a whole driving wheel assembly including said respective motor, $r_T$ is a radius of said second driving wheel and $a_T$ is said wheel acceleration.

3. A driving force controller according to claim 2, wherein said fourth driving force ($\Delta F$) is calculated according to the following formula $$\Delta F = (I/r_T^2) \cdot (\Delta V/\Delta t)$$

where $\Delta V$ is said difference and $\Delta t$ is a period of time needed to stop slipping.

4. A driving force controller according to claim 1, wherein said determination means determines that a driving wheel having a lowest wheel speed of the driving wheels of the electric vehicle does not substantially slip and the other driving wheels of the electric vehicle do substantially slip during acceleration of the electric vehicle, and that a driving wheel having a highest wheel speed of the driving wheels of the electric vehicle does not substantially slip and the other driving wheels of the electric vehicle do substantially slip during deceleration of the electric vehicle.

5. A driving force controller according to claim 1, further comprising means for gradually increasing said fifth driving force $F_{C1}$ when said difference ($\Delta V$) is substantially zero.

6. An electric vehicle comprising a driving force controller set forth in claim 1.

7. A method for controlling driving forces that are applied to driving wheels of an electric vehicle by respective electric motors, comprising the steps of:
   (a) determining whether each of the driving wheels are substantially slipping;
   (b) detecting a first wheel speed ($V_Q$) of a first driving wheel determined to not be substantially slipping and a second wheel speed ($V_T$) of a second driving wheel determined to be substantially slipping;
   (c) calculating a difference ($\Delta V = V_T - V_Q$) between said first wheel speed ($V_Q$) and said second wheel speed ($V_T$);
   (d) calculating a wheel acceleration ($a_T$) of said second driving wheel in accordance with said second wheel speed ($V_T$);

(e) calculating a first driving force ($F_B$) which has been produced by a respective one of said electric motors to accelerate said second driving wheel at said wheel acceleration ($a_T$) in a predetermined past time interval with respect to a current time;

(f) calculating a second driving force ($F_S$) which is an excessive component of said first driving force ($F_B$) that does not contribute to acceleration of said second driving wheel;

(g) calculating a third driving force ($F_U = F_B - F_S$), which is an optimal driving force to be produced by said respective one of said motors to drive said second driving wheel against a road surface, by subtracting said second driving force ($F_S$) from said first driving force ($F_B$);

(h) calculating a fourth driving force ($\Delta F$) for adjusting a driving force to be applied to said second driving wheel;

(i) calculating a fifth driving force ($F_{C1} = F_U - \Delta F$) by subtracting said fourth driving force ($\Delta F$) from said third driving force ($F_U$); and (j) controlling said respective one of said motors, to drive said second driving wheel at said fifth driving force ($F_{C1}$)

8. A driving force controller for an electric vehicle having a plurality of driving wheels driven by respective electric motors, comprising:

a) means for determining whether the electric vehicle is accelerating or decelerating;

b) means for determining a wheel speed for each of the driving wheels of the electric vehicle;

c) means for determining a vehicle speed of the electric vehicle by using a wheel speed corresponding to one of said driving wheels having a lowest wheel speed during an acceleration of the electric vehicle, and by using a wheel speed corresponding to one of said driving wheels having a highest wheel speed during a deceleration of the electric vehicle;

d) means for determining whether each of the respective driving wheels are substantially slipping by comparing each of said respective wheel speeds to said vehicle speed, wherein a driving wheel is determined to be substantially slipping if its respective wheel speed differs from the vehicle speed by a predetermined amount;

e) means for calculating a difference between a first wheel speed corresponding to one of said respective driving wheels that is determined to be not substantially slipping, and a second wheel speed corresponding to another of said respective driving wheels that is determined to be substantially slipping;

f) means for calculating a wheel acceleration of said another driving wheel in accordance with said second wheel speed computed over at least two instants in time;

g) means for calculating a first driving force which has been produced by a respective one of said electric motors to accelerate said another driving wheel at a predetermined past time interval with respect to a current time;

h) means for calculating a second driving force which is an excessive component of said first driving force that has not been produced to accelerate said another driving wheel;

i) means for calculating a third driving force, which is an optimal driving force to be produced by said respective one of said motors to drive said another driving wheel against a road surface, by subtracting said second driving force from said first driving force;

j) means for calculating a fourth driving force for adjusting a driving force to be applied to said another driving wheel;

k) means for calculating a fifth driving force by subtracting said fourth driving force from said third driving force; and l) means for controlling said respective motor to drive said another driving wheel at said fifth driving force.

9. A driving force controller according to claim 8, wherein said means for determining whether the electric vehicle is accelerating or decelerating by monitoring whether a driver of the electric vehicle is depressing or releasing an acceleration pedal and by monitoring whether said driver is depressing or releasing a brake pedal of the electric vehicle.

10. A driving force controller according to claim 8, further comprising means for gradually increasing said fifth driving force when said difference is substantially zero.

11. An electric vehicle comprising a driving force controller set forth in claim 8.

* * * * *